United States Patent
Kim et al.

(10) Patent No.: US 9,426,120 B1
(45) Date of Patent: Aug. 23, 2016

(54) LOCATION AND TIME BASED MOBILE APP POLICIES

(71) Applicant: MOBILE IRON, INC., Mountain View, CA (US)

(72) Inventors: Mansu Kim, Cupertino, CA (US); Joshua Sirota, Los Altos, CA (US); Suresh Kumar Batchu, Milpitas, CA (US)

(73) Assignee: MOBILE IRON, INC., Mountain View, CA (US)

( * ) Notice: Subject to any disclaimer, the term of this patent is extended or adjusted under 35 U.S.C. 154(b) by 41 days.

(21) Appl. No.: 14/137,853

(22) Filed: Dec. 20, 2013

Related U.S. Application Data

(60) Provisional application No. 61/745,487, filed on Dec. 21, 2012.

(51) Int. Cl.
*G06F 17/00* (2006.01)
*H04L 29/06* (2006.01)

(52) U.S. Cl.
CPC ................................ *H04L 63/0227* (2013.01)

(58) Field of Classification Search
CPC .................................................. H04L 63/0227
USPC ............................................................ 726/1
See application file for complete search history.

(56) References Cited

U.S. PATENT DOCUMENTS

| | | | |
|---|---|---|---|
| 8,549,656 B2 | 10/2013 | Blaisdell et al. | |
| 2007/0006321 A1* | 1/2007 | Bantz | G06F 21/6218 726/27 |
| 2009/0320089 A1 | 12/2009 | Lyons et al. | |
| 2009/0322890 A1* | 12/2009 | Bocking | G03B 17/00 348/211.2 |
| 2012/0172027 A1* | 7/2012 | Partheesh et al. | 455/420 |
| 2012/0303872 A1* | 11/2012 | Benhase | G06F 12/0897 711/103 |
| 2012/0330734 A1* | 12/2012 | Brown et al. | 705/14.5 |

OTHER PUBLICATIONS

U.S. Appl. No. 14/137,758, Office Action mailed Mar. 6, 2014.

* cited by examiner

*Primary Examiner* — Mohammad W Reza
(74) *Attorney, Agent, or Firm* — Van Pelt, Yi & James LLP

(57) ABSTRACT

Location and time based mobile app policies are disclosed. One or more location and time policies are received at a management agent on a device. The policies are calculated by processing user and group information. Policy information in a bus is updated with a current allowed state. Location information is received from the device. The location information includes a new location that is not an allowed location. A use of an application may be blocked by the management agent based at least in part on the received location information.

17 Claims, 2 Drawing Sheets

Apps:

| Name | Description |
|---|---|
|  Game | Personal Game apps |
|  Cloud File | Personal Cloud file share app |
|  Viewer | Enterprise Document viewer, embedded with enterprise zone library code to access AppConnect Bus. (appid=company.viewer.De) |
|  SFA | Enterprise Sales Automation tool, embedded with enterprise zone library code to access AppConnect Bus. (appid=company.SFA.Ae) |
|  Browser | Personal Web browser |
|  | Management Agent |
|  File Access | Enterprise File sharing app, embedded with enterprise zone library code to access AppConnect Bus. (appid=company.files.Se) |
|  Mail | Platform mail client app |
|  Managed browser | Enterprise Managed Web browser, embed enterprise zone library code to access AppConnect Bus. (appid=company.browser.Be) |
|  ERP | Enterprise ERP App, embed enterprise zone library code to access AppConnect Bus |

FIG. 1

LOCATION AND TIME BASED MOBILE APP POLICIES

CROSS REFERENCE TO OTHER APPLICATIONS

This application claims priority to U.S. Provisional Patent Application No. 61/745,487 entitled LOCATION AND TIME BASED MOBILE APP POLICIES filed Dec. 21, 2012 which is incorporated herein by reference for all purposes.

BACKGROUND OF THE INVENTION

Today many enterprises are building multiple enterprise apps, for example, Patient information app, Factory automation app, ERP, CRM, Factory automation to reserving conference rooms. Some of those apps have to be allowed or disallowed in certain situations.

BRIEF DESCRIPTION OF THE DRAWINGS

FIG. 1 is a table including apps that may be installed on a mobile device according to various embodiments.

DETAILED DESCRIPTION

Figure 2:
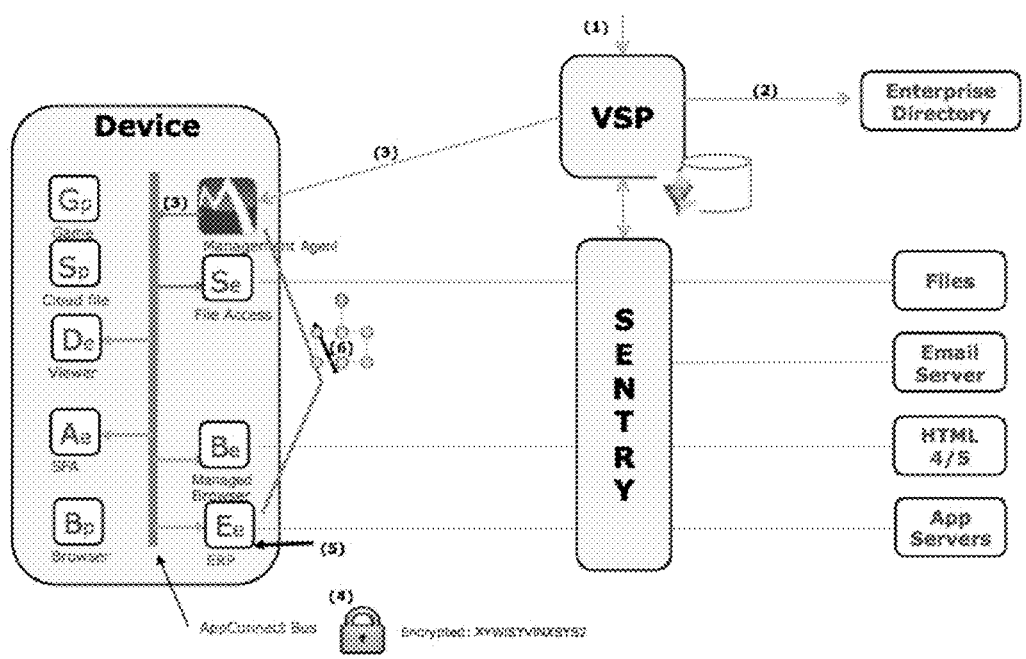
FIG. 2 is a block diagram illustrating a system including location and time based app policies according to various embodiments.

Techniques to provide an Enterprise zone which will be aware of device location and time/day before authorizing app launching are disclosed.

Some apps have to be allowed or disallowed (i.e., their use prevented) while devices are physically in certain location (for example, allow certain apps to run only when devices are in hospital building or factory building) or certain time schedule (for example, allow use between 8 am to 5 pm).

In summary, location and time awareness are provided in a mobile device enterprise zone. The enterprise zone is a zone within which a degree of control or management is provided over apps, and apps not in the zone are not able to communicate with or access data of apps in the zone. In some embodiments, the enterprise zone provides the ability to allow or disallow information to apps which have had an enterprise zone library embedded into them, e.g, using a software developer kit (SDK) or other tool.

User authentication, authorization, and lock zone code (enterprise zone library) added to apps developed for the Zone. For each session authentication will validate the user's credential with the enterprise authentication and store an authentication cookie with expiration based on authentication policy. After authentication, list of authorized apps will be updated. Lock zone is to lock the zone apps, so user can share the device with other employees, customers, family members and friends. The user can unlock the zone with the zone passcode and continue previous enterprise zone session.

VSP stands for Virtual Smartphone Platform by MobileIron. In some embodiments, VSP is used to provide and/or configure an enterprise zone as described herein. All managed mobile devices' configuration, policies and apps are managed from here. MobileIron clients connect to VSP on a periodic basis to update the device status as well as get the new configuration and policies.

FIG. 1 is a table including apps that may be installed on a mobile device according to various embodiments.

FIG. 2 is a block diagram illustrating a system including location and time based app policies according to various embodiments.

(1) Enterprise IT administrator configure enterprise policies (Location, Time schedule, and device posture) to VSP. For example, {app=ERP, allowLocation={wifi= [{ssid=hospital, bssid=001c.0ed1.ac80} ], cellular= [{mnc=123,mcc=123}],latlong=[{lat=1.1,long=2.2,radius=2}]}, disallowLocation={wifi=[{ssid=hospital, bssid=001c.0ed1.ac80}], cellular=[{mnc=123,mcc=123}], latlong=[{lat=1.1,long=2.2,radius=2} ]} }

(2) VSP will calculate applicable policies to each device by processing user and group relationship in enterprise directory.

(3) Management Agent will receive this location and time based policies

For example, {app=ERP,allowLocation={wifi= [{ssidhash=abcd123, bssidhash=cdef1234}], cellularhash= [{mncmcc=fda123}],latlong=[{lat=1.1,long=2.2,radius=2}]} }

(4) Management Agent will update policies information in AppConnect Bus with current allowed state. AppConnect Bus in various embodiments provides secure communication between apps within the enterprise zone; e.g., via encrypted content shared via a pasteboard or other mechanism. For example, if device is currently connected with wifi ssid hospital with bssid 001c.0ed1.ac80, ERP app will be allowed to authorized app list. {Zone={authenticationExpire=1343071545, AuthorizedApps=[{appid=company.files.Se,locationPolicy=1}, {appid=company.browser.Be,locationPolicy=2}, {appid=company.SFA.Ae,locationPolicy2}, {appid=company.viewer.De, location policy=3}, {appid=company.ERP.Ee, LocationPolicy=1], zoneLock=false}, LocationPolicy={1={wifi= [{ssidhash=abcd123, bssidhash=cdef1234}]}}}

(5) User can use ERP app. Enterprise zone library in ERP app will receive location change from device.

(6) When user moved to new location where location is not in allowLocation, Enterprise Zone library will forward user to Management agent and Management agent will block the user from using the app and inform the user appropriately Location information will be gathered by the management agent either from the operating system or an app that can determine the location (app could be part of AppConnect bus or outside AppConnect bus)

What is claimed is:

1. A method, comprising:
receiving, at a management agent on a device from a remote enterprise server, one or more location and time policies that include policy information, wherein the one or more location and time policies are calculated by processing user and group information, wherein the device includes applications located inside an enterprise zone and applications located outside of the enterprise zone;
updating the policy information in a bus with a current allowed state;
receiving location information from the device, wherein the location information includes a new location that is not an allowed location; and
blocking, by the management agent, a user of the device from using an application located in the enterprise zone on the device based at least in part on the received location information, wherein the management agent blocks the user of the all applications within the enterprise zone according to the one or more policies.

2. The method of claim 1, further comprising:
authenticating the user of the device; and
in response to authenticating the user of the device, updating a list of authorized applications.

3. The method of claim 2, wherein the authenticating a user of the device comprises validating credentials of the user.

4. The method of claim 1, wherein the blocking of the use of the application includes blocking the use of all applications within the enterprise zone, wherein the enterprise zone is a zone within a degree of control is managed by the management agent on the device.

5. The method of claim 4, wherein the bus corresponds to a secure communication zone over which one or more applications in the enterprise zone communicate.

6. The method of claim 4, wherein at least one of the applications within the enterprise zone is associated with an enterprise library, wherein the enterprise library receives the location information.

7. The method of claim 6, wherein in the event that the location information indicates that a location of the device is not within an allowed location, the enterprise library forwards the at least one of the applications within the enterprise zone to the management agent on the device and the management agent restricts the user from using the at least one of the applications.

8. The method of claim 1, wherein the blocking of the user of the device form using an application on the device comprises restricting the application from being accessed by the user.

9. The method of claim 1, wherein the applications located outside of the zone are unable to communicate with or access data of the applications located in the enterprise zone.

10. A device, comprising:
at least one hardware processor configured to:
receive, at a management agent on the device from a remote enterprise server, one or more location and time policies that include policy information, wherein the one or more location and time policies are calculated by processing user and group information, wherein the device includes applications located inside an enterprise zone and applications located outside of the enterprise zone;
update the policy information in a bus with a current allowed state;
receive location information from the device, wherein the location information includes a new location that is not an allowed location; and
block, by the management agent, a user of the device from using an application located in the enterprise zone on the device based at least in part on the received location information, wherein the management agent blocks the user of the all applications within the enterprise zone according to the one or more policies; and
a memory coupled to the at least one processor and configured to provide the at least one processor with instructions.

11. The device of claim 10, wherein the at least one hardware processor is further configured to:
authenticate the user of the device; and
in response to authenticating the user of the device, update a list of authorized applications.

12. The device of claim 11, wherein the authenticating a user of the device comprises validating credentials of the user.

13. The device of claim 10, wherein the blocking of the use of the application includes blocking the use of all applications within the enterprise zone, wherein the enterprise zone is a zone within a degree of control is managed by the management agent on the device.

14. The device of claim 13, wherein the bus corresponds to a secure communication zone over which one or more applications in the enterprise zone communicate.

15. The device of claim 13, wherein at least one of the applications within the enterprise zone is associated with an enterprise library, wherein the enterprise library receives the location information.

16. The device of claim 15, wherein in the event that the location information indicates that a location of the device is not within an allowed location, the enterprise library forwards the at least one of the applications within the enterprise zone to the management agent on the device and the management agent restricts the user from using the at least one of the applications.

17. A computer program product embodied in a tangible, non-transitory computer readable storage medium, comprising computer instructions for:
receiving, at a management agent on a device from a remote enterprise server, one or more location and time policies that include policy information, wherein the one or more location and time policies are calculated by processing user and group information, wherein the device includes applications located inside an enterprise zone and applications located outside of the enterprise zone;
updating the policy information in a bus with a current allowed state;
receiving location information from the device, wherein the location information includes a new location that is not an allowed location; and
blocking, by the management agent, a user of the device from using an application located in the enterprise zone on the device based at least in part on the received location information, wherein the management agent blocks the user of the all applications within the enterprise zone according to the one or more policies.

* * * * *